US008995632B1

(12) United States Patent  
Boriskovsky et al.

(10) Patent No.: US 8,995,632 B1  
(45) Date of Patent: Mar. 31, 2015

(54) SYSTEM, METHOD, AND COMPUTER PROGRAM FOR DETECTING DUPLICATED TELECOMMUNICATIONS EVENTS IN A CONSUMER TELECOMMUNICATIONS NETWORK

(71) Applicant: Amdocs Software Systems Limited, Dublin (IE)

(72) Inventors: Victoria Boriskovsky, Kfar-Saba (IL); Vladimir Polonsky, Ramat-Gan (IL); Omer Shani, Savyon (IL); Nir Cohen, Tel-Mond (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/184,626

(22) Filed: Feb. 19, 2014

Related U.S. Application Data

(60) Provisional application No. 61/807,810, filed on Apr. 3, 2013.

(51) Int. Cl.  
*H04M 15/00* (2006.01)

(52) U.S. Cl.  
CPC .................. *H04M 15/41* (2013.01)  
USPC .................. 379/114.04; 379/126

(58) Field of Classification Search  
CPC ..... H04M 15/00; H04M 15/41; H04M 15/43; H04M 15/44  
USPC .......... 379/114.04, 121.05, 126, 133  
See application file for complete search history.

(56) References Cited

U.S. PATENT DOCUMENTS

| 6,385,444 | B1 * | 5/2002 | Peschel et al. ............... 455/405 |
| 7,085,360 | B1 * | 8/2006 | Sprouse ................... 379/114.04 |
| 7,155,205 | B2 * | 12/2006 | Cerami et al. ............... 455/406 |
| 8,331,543 | B2 * | 12/2012 | Ramanathan et al. ... 379/112.01 |
| 8,645,415 | B2 * | 2/2014 | Pearson et al. ................ 707/769 |
| 2005/0018824 | A1 * | 1/2005 | Richardson .................. 379/126 |

* cited by examiner

*Primary Examiner* — Quoc D Tran  
(74) *Attorney, Agent, or Firm* — Zilka-Kotab, PC

(57) ABSTRACT

A system, method, and computer program product are provided for detecting duplicated telecommunications events in a consumer telecommunications network. In use, a first telecommunications event and associated first event data are received. One or more fields of data are extracted from the first event data. Additionally, a single data string is generated from the extracted one or more fields of data. Further, a hash function is utilized to create a first event signature corresponding to the single data string from the extracted one or more fields of data. In addition, a first event signature hint is extracted from the first event signature, the first event signature hint including a portion of the first event signature. Furthermore, it is determined whether the first event signature hint exists in a signature hint hash table. Responsive to determining that the first event signature hint does not exist in the signature hint hash table, the first event signature hint is stored in the signature hint hash table and the first event data associated with the first telecommunications event is stored in a telecommunications event storage. Additionally, responsive to determining that the first event signature hint exists in the signature hint hash table, it is determined whether the first telecommunications event is identical to a previously received second telecommunications event stored in the telecommunications event storage. Moreover, responsive to determining that the first telecommunications event is identical to the previously received second telecommunications event stored in the telecommunications event storage, the first telecommunications event and the second telecommunications event are designated as a duplicate event.

20 Claims, 6 Drawing Sheets

SYSTEM, METHOD, AND COMPUTER PROGRAM FOR DETECTING DUPLICATED TELECOMMUNICATIONS EVENTS IN A CONSUMER TELECOMMUNICATIONS NETWORK

CLAIM OF PRIORITY

This application claims the benefit of U.S. Provisional Application No. 61/807,810, filed Apr. 3, 2013, the entire contents of which are incorporated herein by reference.

FIELD OF THE INVENTION

The present invention relates to telecommunications networks, and more particularly to detecting duplicate events in such telecommunications networks.

BACKGROUND

In the last few years, the emergence of smart phones and broad-band data availability has caused the amount of real-time events processed in billing systems of communication operators to grow rapidly. The large amount of event processing has resulted in an increase of duplicate events, which are events received twice by the billing system. Duplicate events generally include events that are re-sent to the billing system because of network inherent race conditions, faults in processing, and/or communication problems.

Arrivals of duplicate events may be delayed, in some cases, up to several days. Additionally, the event history against which a duplicate verification needs to be performed may include several thousands of events per user, and billions of events for an entire system.

The vast amount of events may pose complexities of latency. Since duplicate event checking must be considered before processing and sending the event, it creates a large obstacle in real-time processing of these events. There is thus a need for addressing these and/or other issues associated with the prior art.

SUMMARY

A system, method, and computer program product are provided for detecting duplicated telecommunications events in a consumer telecommunications network. In use, a first telecommunications event and associated first event data are received. One or more fields of data are extracted from the first event data. Additionally, a single data string is generated from the extracted one or more fields of data. Further, a hash function is utilized to create a first event signature corresponding to the single data string from the extracted one or more fields of data. In addition, a first event signature hint is extracted from the first event signature, the first event signature hint including a portion of the first event signature. Furthermore, it is determined whether the first event signature hint exists in a signature hint hash table. Responsive to determining that the first event signature hint does not exist in the signature hint hash table, the first event signature hint is stored in the signature hint hash table and the first event data associated with the first telecommunications event is stored in a telecommunications event storage. Additionally, responsive to determining that the first event signature hint exists in the signature hint hash table, it is determined whether the first telecommunications event is identical to a previously received second telecommunications event stored in the telecommunications event storage. Moreover, responsive to determining that the first telecommunications event is identical to the previously received second telecommunications event stored in the telecommunications event storage, the first telecommunications event and the second telecommunications event are designated as a duplicate event.

DETAILED DESCRIPTION

Figure 1:
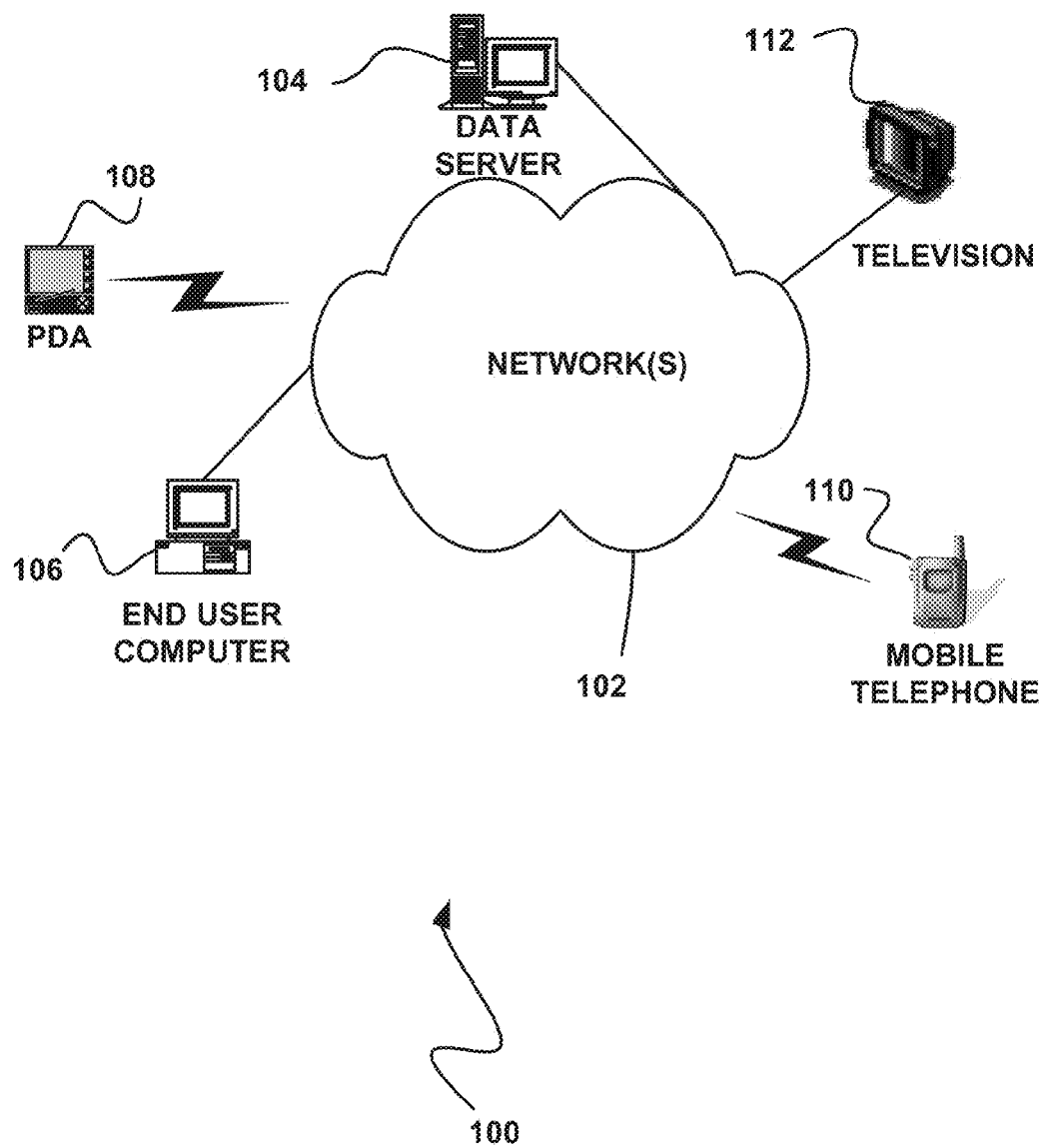
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
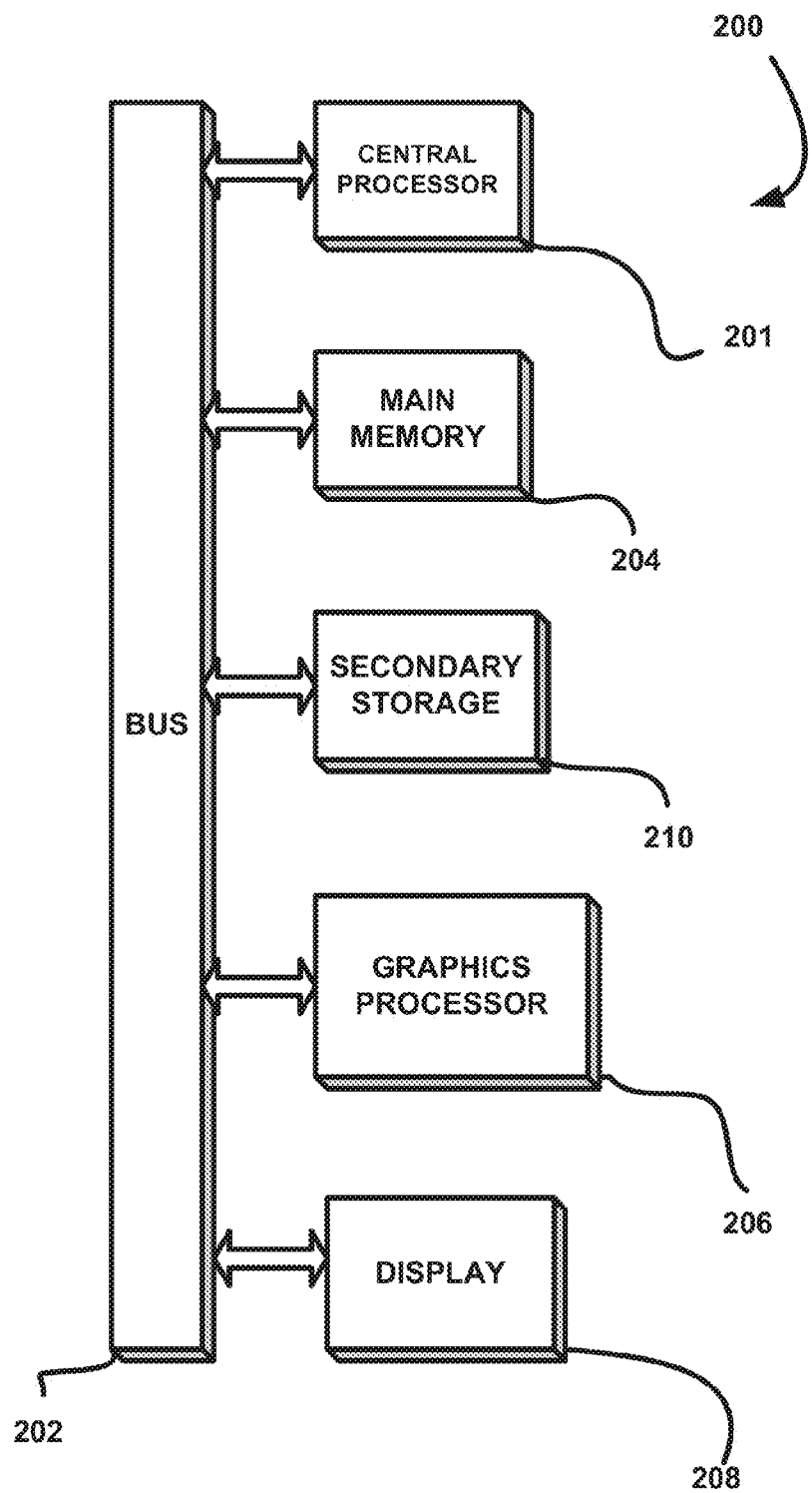
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
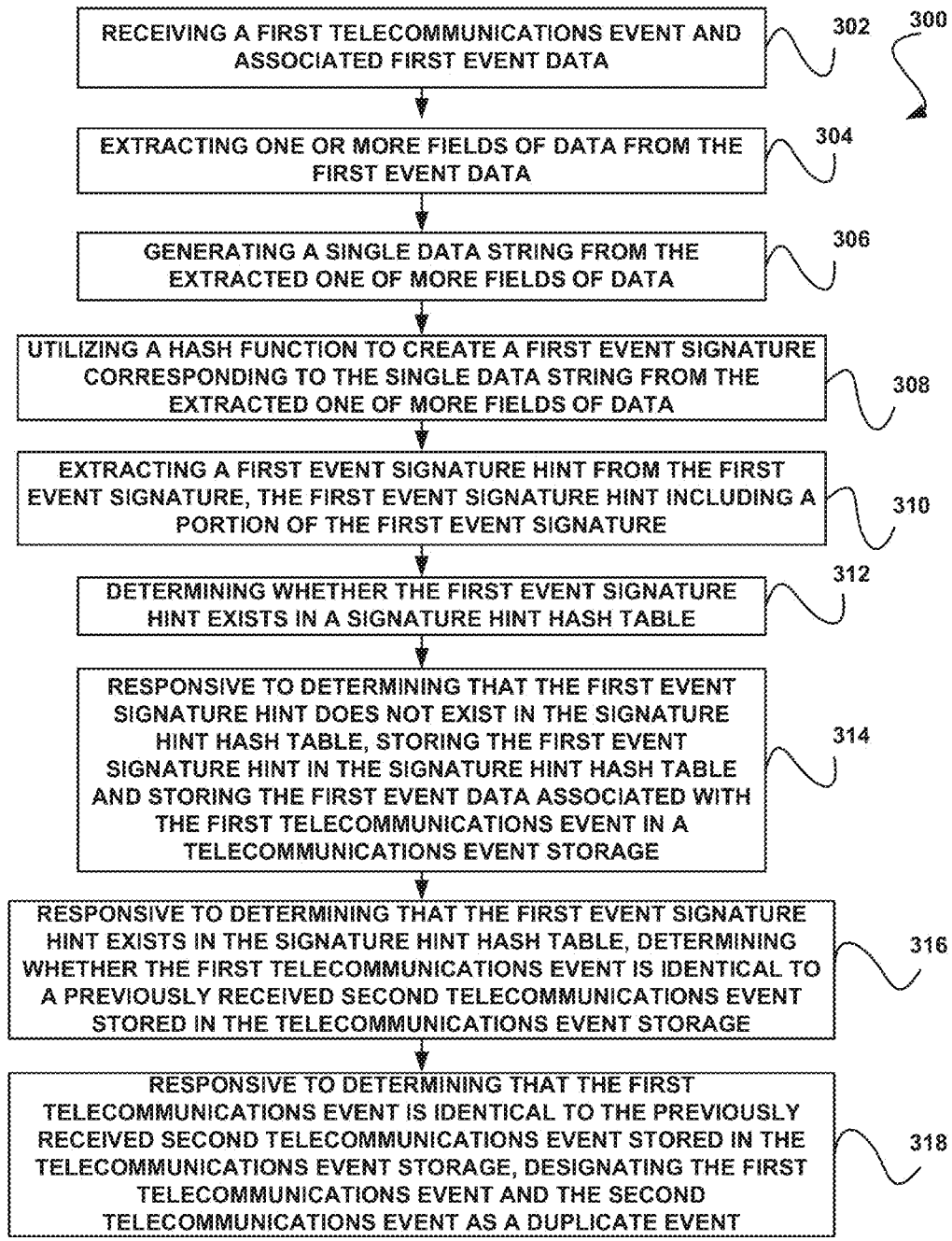
FIG. 3 illustrates a method for detecting duplicated telecommunications events in a consumer telecommunications network, in accordance with one embodiment.

FIG. 3 illustrates a method 300 for detecting duplicated telecommunications events in a consumer telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first telecommunications event and associated first event data are received. See operation 302. The telecommunications event may include any event associated with a telecommunications system. For example, in one embodiment, the telecommunications event may include a billable event. In various embodiments, the billable event may be associated with data usage, a call, a message (e.g. an SMS message, on MMS message, etc.), roaming, and/or various other events. In one embodiment, the telecommunications event and data may be received from a device associated with a user in a telecommunications network. Further, in one embodiment, the event and data may be received by a system associated with billing.

Further, one or more fields of data are extracted from the first event data. See operation 304. The fields of data may include any data associated with the first event. For example, in one embodiment, the one or more fields of data may include one or more attributes associated with the first telecommunications event that are capable of being utilized to uniquely identify the first telecommunications event.

Additionally, a single data string is generated from the extracted one or more fields of data. See operation 306. For example, in one embodiment, generating the single data string from the extracted one or more fields of data may include concatenating the one or more fields of data to form the single data string.

Further, a hash function is utilized to create a first event signature corresponding to the single data string from the extracted one or more fields of data. See operation 308. In one embodiment, utilizing the hash function to create the first event signature may include translating the single data string into a small signature. Additionally, in one embodiment, a length of the first event signature may be based on a density of events per user in a telecommunications network associated with the first telecommunications event.

In addition, a first event signature hint is extracted from the first event signature, the first event signature hint including a portion of the first event signature. See operation 310. In one embodiment, extracting the first event signature hint from the first event signature may include utilizing a predefined number of rightmost bits of the first event signature. Of course, any number of bits may be utilized, in various embodiments. Furthermore, in various embodiments, any portion of the first event signature may be utilized to generate the hint.

In one embodiment, a hash-index may be generated utilizing the entire first event signature. In this case, the hash-index may be stored with the first event signature hint.

Furthermore, it is determined whether the first event signature hint exists in a signature hint hash table. See operation 312. Responsive to determining that the first event signature hint does not exist in the signature hint hash table, the first event signature hint is stored in the signature hint hash table. Additionally, the first event data associated with the first telecommunications event is stored in a telecommunications event storage. See operation 314. In addition, if it is determined that the first event signature hint does not exist in the signature hint hash table, the first telecommunications event may be designated as a new/original event. In one embodiment, the telecommunications event storage may include persisted storage.

Additionally, responsive to determining that the first event signature hint exists in the signature hint hash table, it is determined whether the first telecommunications event is identical to a previously received second telecommunications event stored in the telecommunications event storage. See operation 316. If the first telecommunications event is identical to the previously received second telecommunications event stored in the telecommunications event storage, the first telecommunications event and the second telecommunications event are designated as a duplicate event. See operation 318.

In one embodiment, the first event signature may be stored in the telecommunications event storage, in addition to the one or more fields of data. In this case, as an option, determining whether the first telecommunications event is identical to the previously received second telecommunications event stored in the telecommunications event storage may include comparing the first event signature to a second event signature corresponding to the second telecommunications event. As another option, determining whether the first telecommunications event is identical to the previously received second telecommunications event stored in the telecommunications event storage may further include comparing the one or more fields of data associated with the first telecommunications event with a second one or more fields of data associated with the second telecommunications event.

If it is determined that the first telecommunications event is not identical to the previously received second telecommunications event stored in the telecommunications event storage, the first telecommunications event may be designated as a false alarm and/or a new/original event. Additionally, in response to the determination, the first event signature hint may be stored in the signature hint hash table. Furthermore, the first event data associated with the first telecommunications event may be stored in the telecommunications event storage.

Still yet, in one embodiment, responsive to determining that the first telecommunications event is identical to the previously received second telecommunications event stored in the telecommunications event storage, data from the telecommunications event storage may be extracted to generate a message indicating the first telecommunications event is a duplicate response. In this case, the message indicating the first telecommunications event is a duplicate response may be sent to a network element associated with the telecommunications network that sent the first telecommunications event.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Current event processing system in telecommunications, finance, and other areas work in very short real-time request-response cycles where responses are expected within a few milliseconds. However, these same systems are intolerant of duplicate events, which may result in a double charge and wrong resource allocation.

Typically, incoming events have some fields that make them unique, and enable the detection of a repetition of an event (e.g. due to network or client problems). The combination of these fields identifies these events in a 1:1 relation, and checking this combination ensures that the events are not repeated. However, trying to keep these fields in memory for the sake of fast checking puts a heavy load on the required memory, especially due to the constantly increasing number of events that need to be checked. In current telecommunications systems, the period over which duplicate events may be received is typically several days, and the number of events can reach hundreds per user.

Accordingly, the techniques described herein allow for dramatically reducing the amount of memory required for keeping a signature of an event, using this signature as a hint filter, and reducing the need to retrieve the entire event record to only a negligible fraction of the number of events. This technique eliminates the probability of missing a duplicate event. Further, the number of tolerable false alarms may be predetermined to be negligible.

In the context of event duplicate checking systems, a "hit" refers to a duplicated event that is identified as a duplicated event. A "correct reject" (CR) refers to a new, unique event. A "miss" refers to a duplicate event that is identified as a new event, and is processed as a new event (creating double charging, etc.). A "false alarm" (FA) refers to a new event that is falsely identified as a duplicate event and is not processed, causing revenue leakage, or additional processing to further check the event.

One purpose of a duplicate check system is to eliminate miss cases, while keeping the costly false alarms to a minimum. The most frequent behavior is a correct reject, which should generally exceed 99.9% of all events.

One technique of identifying a duplicate event is by identifying key attributes of the event that cannot be changed between the two instances in which it is sent into the processing system. This list of attributes may exist in all events, or at least at a level in which the events are recognizable. In many cases, a session-ID attribute and/or a request-number attribute may be considered a sufficiently unique identifier of the event. In some cases, the possible length of these two attributes may be up to 280 bytes, which makes it very costly to keep them as is. Accordingly, in one embodiment, duplicate-key fields may be hashed into a standard size hash signature.

Figure 4:
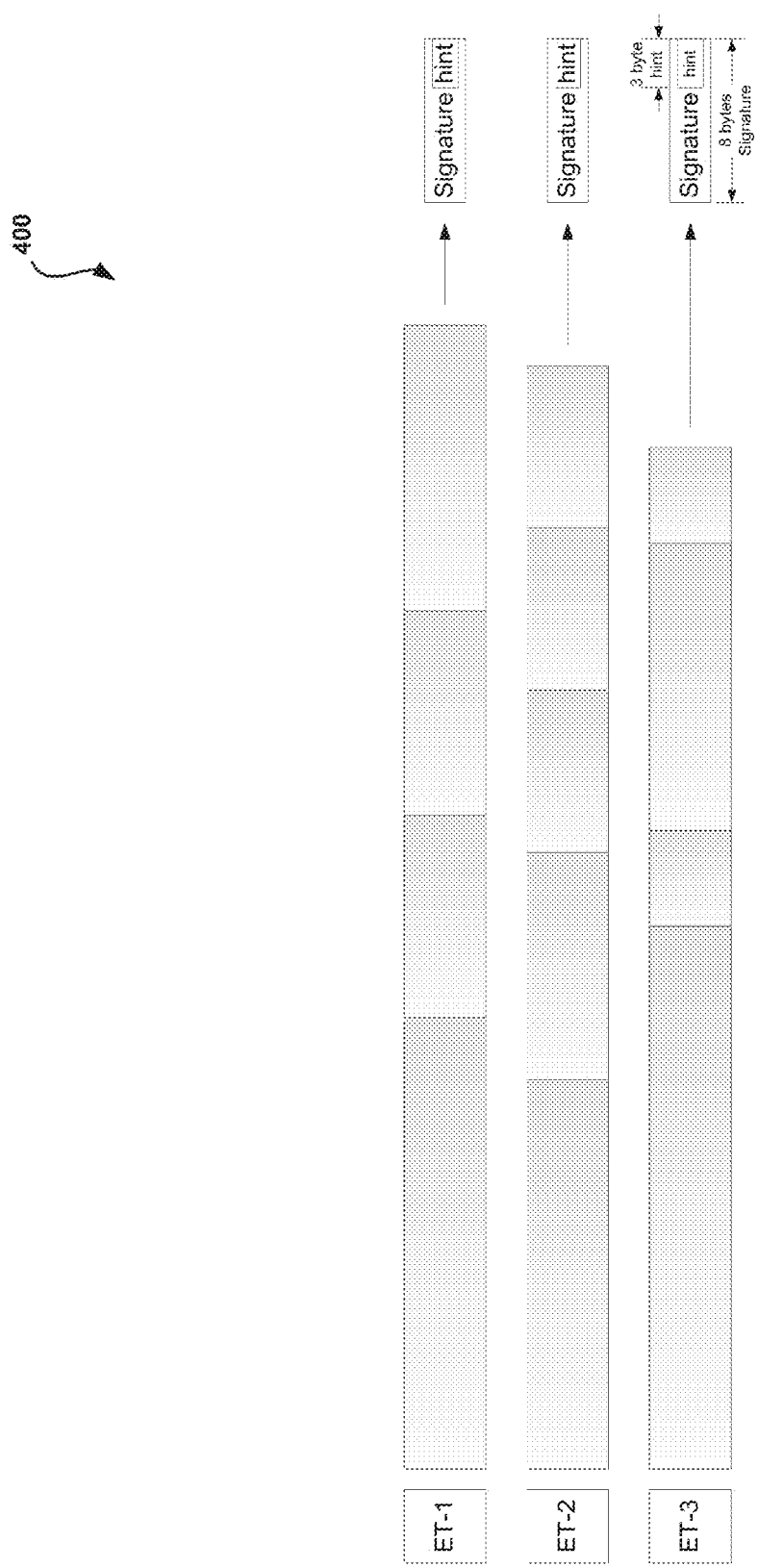
FIG. 4 illustrates a diagram showing hashing of duplicate-key fields into a standard size hash signature, in accordance with one embodiment.

FIG. 4 illustrates a diagram 400 showing hashing of duplicate-key fields into a standard size hash signature, in accordance with one embodiment. As an option, the diagram 400 may be implemented in the context of the details of FIGS. 1-3. Of course, however, the diagram 400 may be implemented in the context of any desired environment. Further, the aforementioned definitions may equally apply to the description below.

FIG. 4 shows the creation of a hash-signature of an event, in accordance with one embodiment. By employing a uniform hash function, and a sufficiently large hash-value result, the probability of having the same signature for two original events is extremely low. As shown in FIG. 4, a hint is taken as the three rightmost bytes out of the full 8-byte signature.

As an example, when using a 4-byte signature, the probability is $1:2^{32}$, or about 1:4,000,000,000. When there are one thousand of such stored signatures, the probability is still sufficiently low. Using a larger signature makes the probability even better.

The amount of memory required in this case is the number of stored events multiplied by the size of the signature. Still, the signature in memory can be reduced further by keeping only a configurable part of that signature in memory, ensuring a chance for repetition, and then checking against the persisted data for the full unique pattern.

In one embodiment, the events may be stored in memory as a hash-array using a modulo over the full value of the signature, while a hint is taken as the M rightmost of bytes out of the full N-byte signature, making the chances of a receiving false alarm even smaller.

For example, an event may be used to generate a 6-byte signature, a hash-array of 127 slots (primary number), and a three byte hint. In this case, the chance of two original events having the same signature is $1:2^{48}$. The chance of having two events with the same hash-hint is $1:2^{24}$. Further, the chance of having these same hash-hint numbers assigned to the same hash-array slot is dose to $1:2^{31}$, which is about 1:2,000,000,000.

Figure 5:
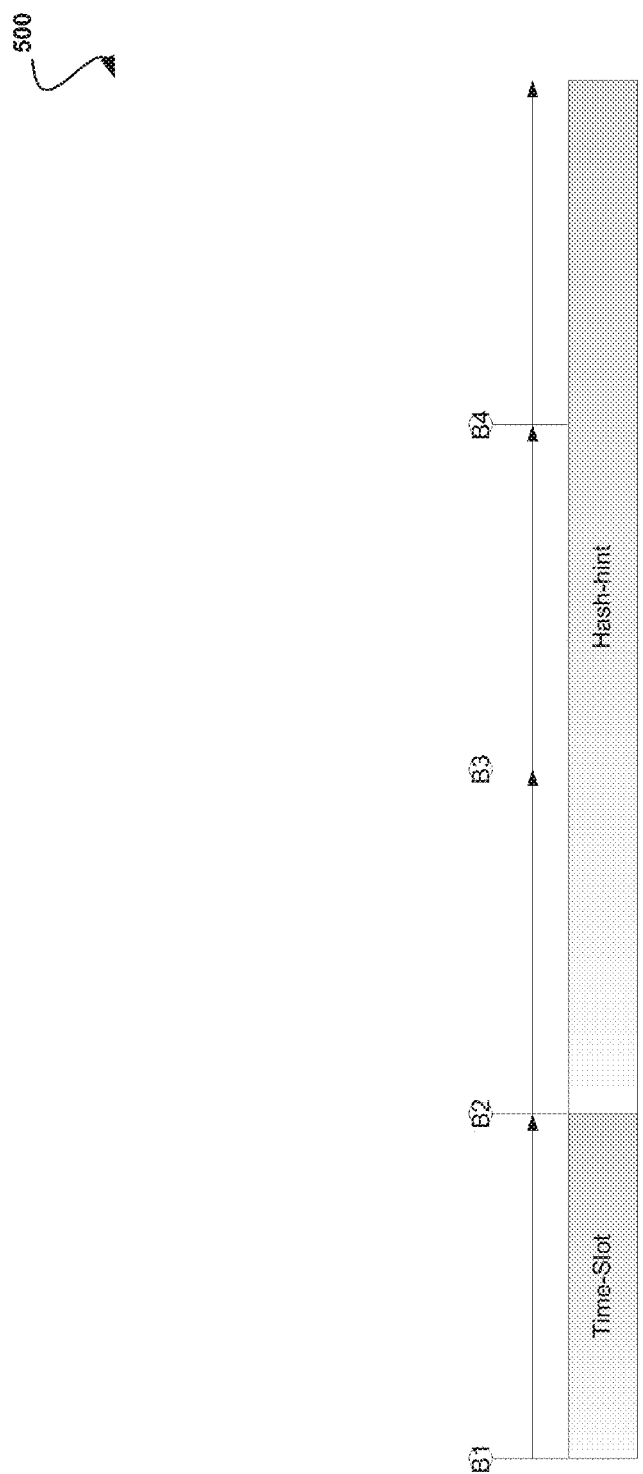
FIG. 5 illustrates a diagram showing hashing of a hash hint created from a signature, in accordance with one embodiment.

FIG. 5 illustrates a diagram 500 showing hashing of a hash hint created from a signature, in accordance with one embodiment. As an option, the diagram 500 may be implemented in the context of the details of FIGS. 1-4. Of course, however, the diagram 500 may be implemented in the context of any desired environment. Further, the aforementioned definitions may equally apply to the description below.

As shown, a hint created from the signature includes a 3-byte hint from the last 3-bytes of the signature. In various embodiments, different sized hints may be generated from different portions of the signature.

Figure 6:
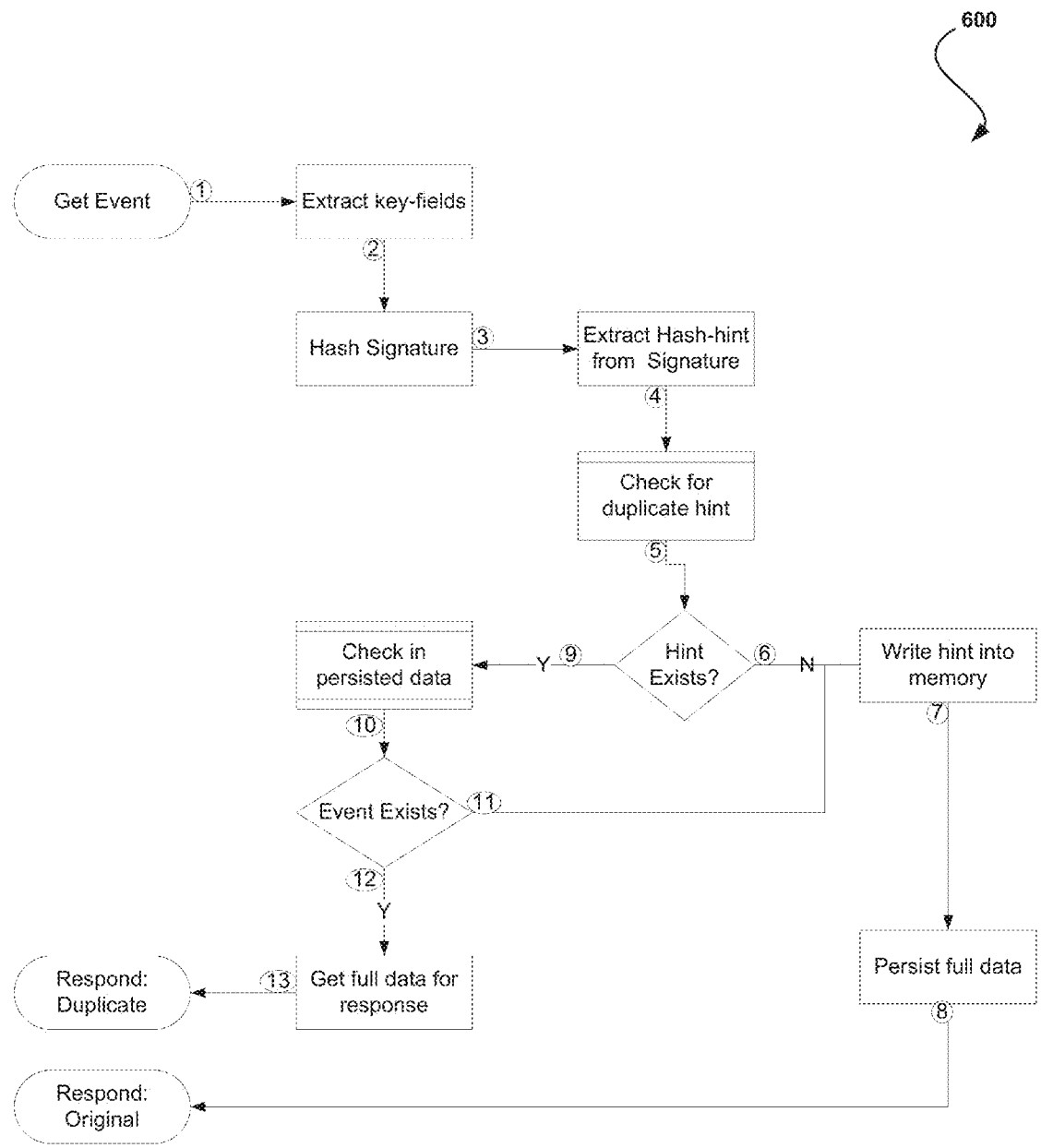
FIG. 6 illustrates a flow diagram for checking for duplicate events in a system, in accordance with one embodiment.

FIG. 6 illustrates a flow diagram 600 for checking for duplicate events in a system, in accordance with one embodiment. As an option, the diagram 600 may be implemented in the context of the details of FIGS. 1-5. Of course, however, the diagram 600 may be implemented in the context of any desired environment. Further, the aforementioned definitions may equally apply to the description below.

As shown, an event is received from an external source. See step 1. The event may include an original or a duplicate event. According to the source and the event type, the fields that potentially identify this event as unique are extracted from the data sent. See step 2. These fields are concatenated to a single string.

A hash function then translates the single string into a small signature. See step 3. In one embodiment, the length of a signature (N) may be determined according to the density of the events per user in the system (e.g. where N is an integer such as 1, 2, 3, 4, etc.). A size of 4 already limits the chance of a false alarm to 1:400,000,000.

A hint is extracted using the M rightmost bits of the signature, and a hash-index is computed using the full signature and the size of a hash-array (e.g. a prime number, so that the distribution of the hint and the hash-index will be independent, etc.). See step 4. In this case, M may be any integer, such as 1, 2, 3, 4, etc.

Further, the system checks for the hash-array in memory that stores the hints for that user, using the hash-index and the hash-hint. See step 5. If the hint does not exist in memory, the event is designated a correct reject, a new and original event. See step 6. The new hint is written into memory. See step 7. After processing the event, the processed event, including all the data required to send a duplicate response later, is written into the persisted storage. See step 8.

If the hint was found, then it is suspected of being a duplicate event, and the event is sent to be checked against the persisted storage to verify that it is indeed a duplicate. See step 9. Since the event in the persisted storage contains the full signature, along with the original unique fields, a full check may be performed. See step 10.

If the event does not exist in the persisted storage, then the event is a false alarm, and should be treated as a normal, original event. See step 11. If the event does exist in the persisted storage, then it is a duplicate. See step 12. The data necessary for a duplicate response is extracted and sent back to the source. See step 13.

Since the occurrence of a duplicate event is usually a rare event and most events are original, the number of events that will be checked against the persisted data will be very small, and most of the operation will take place in memory, using a comparatively small amount of memory, and a simple mechanism to perform the check.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a first telecommunications event and associated first event data;
   extracting one or more fields of data from the first event data;
   generating a single data string from the extracted one or more fields of data;
   utilizing a hash function to create a first event signature corresponding to the single data string from the extracted one or more fields of data;
   extracting a first event signature hint from the first event signature, the first event signature hint including a portion of the first event signature;
   determining whether the first event signature hint exists in a signature hint hash table;
   responsive to determining that the first event signature hint does not exist in the signature hint hash table, storing the first event signature hint in the signature hint hash table and storing the first event data associated with the first telecommunications event in a telecommunications event storage;
   responsive to determining that the first event signature hint exists in the signature hint hash table, determining whether the first telecommunications event is identical to a previously received second telecommunications event stored in the telecommunications event storage; and
   responsive to determining that the first telecommunications event is identical to the previously received second telecommunications event stored in the telecommunications event storage, designating the first telecommunications event and the second telecommunications event as a duplicate event.

2. The method of claim 1, wherein the one or more fields of data include one or more attributes associated with the first telecommunications event capable of being utilized to uniquely identify the first telecommunications event.

3. The method of claim 1, wherein generating the single data string from the extracted one or more fields of data includes concatenating the one or more fields of data to form the single data string.

4. The method of claim 1, wherein utilizing the hash function to create the first event signature includes translating the single data string into a small signature.

5. The method of claim 1, wherein a length of the first event signature is based on a density of events per user in a telecommunications network associated with the first telecommunications event.

6. The method of claim 1, wherein extracting the first event signature hint from the first event signature includes utilizing a predefined number of rightmost bits of the first event signature.

7. The method of claim 1, further comprising generating a hash-index utilizing the entire first event signature.

8. The method of claim 1, further comprising storing the hash-index with the first event signature hint.

9. The method of claim 1, further comprising, responsive to determining that the first event signature hint does not exist in the signature hint hash table, designating the first telecommunications event as a new event.

10. The method of claim 1, further comprising storing the first event signature in the telecommunications event storage.

11. The method of claim 10, further comprising storing the one or more fields of data in the telecommunications event storage.

12. The method of claim 11, wherein determining whether the first telecommunications event is identical to the previously received second telecommunications event stored in the telecommunications event storage includes comparing the first event signature to a second event signature corresponding to the second telecommunications event.

13. The method of claim 12, wherein determining whether the first telecommunications event is identical to the previously received second telecommunications event stored in the telecommunications event storage further includes comparing the one or more fields of data associated with the first telecommunications event with a second one or more fields of data associated with the second telecommunications event.

14. The method of claim 1, further comprising, responsive to determining that the first telecommunications event is not identical to the previously received second telecommunications event stored in the telecommunications event storage, designating the first telecommunications event as a false alarm.

15. The method of claim 1, further comprising, responsive to determining that the first telecommunications event is not identical to the previously received second telecommunications event stored in the telecommunications event storage, storing the first event signature hint in the signature hint hash table and storing the first event data associated with the first telecommunications event in the telecommunications event storage.

16. The method of claim 1, wherein the first telecommunications event is received from a network element associated with a telecommunications network.

17. The method of claim 16, further comprising, responsive to determining that the first telecommunications event is identical to the previously received second telecommunications event stored in the telecommunications event storage, extracting data from the telecommunications event storage to generate a message indicating the first telecommunications event is the duplicate response.

18. The method of claim 17, further comprising sending the message indicating the first telecommunications event is the duplicate response to the network element associated with the telecommunications network.

19. A non-transitory computer readable medium comprising computer executable instructions that when executed by one or more processing cores perform a method comprising:
   receiving a first telecommunications event and associated first event data;
   extracting one or more fields of data from the first event data;
   generating a single data string from the extracted one or more fields of data;

utilizing a hash function to create a first event signature corresponding to the single data string from the extracted one or more fields of data;
extracting a first event signature hint from the first event signature, the first event signature hint including a portion of the first event signature;
determining whether the first event signature hint exists in a signature hint hash table;
responsive to determining that the first event signature hint does not exist in the signature hint hash table, storing the first event signature hint in the signature hint hash table and storing the first event data associated with the first telecommunications event in a telecommunications event storage;
responsive to determining that the first event signature hint exists in the signature hint hash table, determining whether the first telecommunications event is identical to a previously received second telecommunications event stored in the telecommunications event storage; and
responsive to determining that the first telecommunications event is identical to the previously received second telecommunications event stored in the telecommunications event storage, designating the first telecommunications event and the second telecommunications event as a duplicate event.

20. A system comprising:
a memory system; and
one or more processing cores coupled to the memory system and that are each configured to:
receive a first telecommunications event and associated first event data;
extract one or more fields of data from the first event data;
generate a single data string from the extracted one or more fields of data;
utilize a hash function to create a first event signature corresponding to the single data string from the extracted one or more fields of data;
extract a first event signature hint from the first event signature, the first event signature hint including a portion of the first event signature;
determine whether the first event signature hint exists in a signature hint hash table;
responsive to determining that the first event signature hint does not exist in the signature hint hash table, store the first event signature hint in the signature hint hash table and storing the first event data associated with the first telecommunications event in a telecommunications event storage;
responsive to determining that the first event signature hint exists in the signature hint hash table, determine whether the first telecommunications event is identical to a previously received second telecommunications event stored in the telecommunications event storage; and
responsive to determining that the first telecommunications event is identical to the previously received second telecommunications event stored in the telecommunications event storage, designate the first telecommunications event and the second telecommunications event as a duplicate event.

* * * * *